United States Patent [19]

Nakayama

[11] Patent Number: 4,706,098

[45] Date of Patent: Nov. 10, 1987

[54] PRINTING DEVICE

[75] Inventor: Tetsuro Nakayama, Shizuoka, Japan

[73] Assignee: Tokyo Electric Co., Ltd., Tokyo, Japan

[21] Appl. No.: 914,272

[22] Filed: Oct. 2, 1986

[30] Foreign Application Priority Data

Oct. 8, 1985 [JP] Japan ............................ 60-223925

[51] Int. Cl.[4] ............................ G01D 15/16

[52] U.S. Cl. ............................ 346/140 R

[58] Field of Search ................. 346/140; 400/124, 126

[56] References Cited

U.S. PATENT DOCUMENTS 4,047,185 9/1977 Phillips ............................ 346/140 R 4,663,639 5/1987 Owen ............................ 346/140 R

FOREIGN PATENT DOCUMENTS 0195652 9/1986 European Pat. Off. .

*Primary Examiner*—Joseph W. Hartary

*Attorney, Agent, or Firm*—Oblon, Fisher, Spivak, McClelland, & Maier

[57] ABSTRACT

In a printing device including a recording electrode having a front end portion to which ink is supplied, and an opposite electrode arranged in opposed relation to the recording electrode, wherein the ink is electrostatically splashed toward the opposite electrode by an electric field created between the recording electrode and the opposite electrode; the improvement comprises a switch for conditioning the recording electrode and the opposite electrode at an earth potential under a non-printing or a print waiting condition. Under the non-printing or the print waiting condition, the switch is selected not to apply an electrostatic force to the ink present at the front end portion of the recording electrode, thereby preventing undue splash of the ink.

7 Claims, 8 Drawing Figures

PRINTING DEVICE

FIELD OF THE INVENTION AND RELATED ART STATEMENT

The present invention relates to a dot printer designed to carry out printing by the aggregation of dots, and more particularly to a printing device designed to splash ink drops by electrostatic means to form the dots.

A conventional printing device is designed to carry out printing by selectively splashing ink drops by electrostatic means. For instance, the printing device as shown in FIGS. 7 and 8 has been disclosed in Japanese Patent Application No. 60-69484 filed by the same applicant. Referring to FIGS. 7 and 8, ink 1 is stored in an ink tank 2, and an electrode hole 3 is formed through a lower side wall of the ink tank 2. A recording electrode 4 is immersed in the ink 1, and is engaged with the electrode hole 3 at a front end portion thereof. The recording electrode 4 is formed of a material having conductivity and ink impregnating ability. For example, the recording electrode 4 is formed by integrally molding a fibrous material into a bundle with gas permeability in the direction of the fiber maintained. An opposite electrode 6 is arranged in opposed relation to the recording electrode 4 with a recording paper 5 interposed therebetween. The recording electrode 4 is connected at its rear end to one end of a high-voltage switch 7. One of change-over contacts of the high-voltage switch 7 is grounded, while the other contact is connected to the opposite electrode 6 through two high-voltage power sources 8 and 9, a midpoint therebetween being grounded.

In the above-mentioned printing device, the ink 1 stored in the ink tank 2 is impregnated in the recording electrode 4, and is supplied to the front end portion thereof. When the high-voltage switch 7 is selectively turned on according to a print signal, a potential difference is generated between the recording electrode 4 and the opposite electrode 6, and as a result, the ink 1 retained at the front end portion of the recording electrode 4 is splashed toward the opposite electrode 6. Thus, the dots are formed on the recording paper 5 to carry out printing by the aggregation of the dots.

In operation, even when the high-voltage switch 7 is off, the recording electrode 4 and the opposite electrode 6 connected to each other through the ground, and accordingly, a potential difference is generated between both the electrodes 4 and 6 by the high-voltage power source 9. As a result, although the ink 1 at the front end portion of the recording electrode 4 is not splashed, it is swollen in a meniscus manner at the front end portion of the recording electrode 4 as shown in FIG. 8. When the high-voltage switch 7 is turned on under the meniscus condition of the ink, the potential difference between the recording electrode 4 and the opposite electrode 6 is increased to let the ink 1 be separated and splashed from the front end portion of the recording electrode 4. In this manner, as the ink 1 is allowed to be splashed under the meniscus condition, it may be smoothly separated from the front end portion of the recording electrode 4, thereby making proper a splash amount and a splash direction of the ink. The aforementioned construction is particularly adapted to a serial type printing device.

However, the prior art device as mentioned above has the following problems. The ink 1 retained at the front end portion of the recording electrode 4 is affected by an electrostatic force, and is maintained under the meniscus condition, even when the printing device is under the printing waiting condition. To this end, there is a possibility of the ink 1 being splashed even when the recording electrode 4 receives minute shock. In the serial type printing device, a scanning direction of the recording electrode 4 is changed at both transversal ends (such as change in the scanning direction will be referred to as scan inversion) during printing, and therefore, the recording electrode 4 receives shock at all times. As a result, the ink 1 retained at the front end portion of the recording electrode 4 is sometimes splashed in the form of fine particles or ink drops to cause stain of the printing paper 5.

Furthermore, in the serial type printing device, as the electrostatic force at the front end portion of the recording electrode 4 is intensified at the scan inversion timing, the ink 1 is sometimes splashed. That is to say, the recording electrode 4 is brought into a position near a case of the printing device at the scan inversion timing to generate a potential difference between the recording electrode 4 and the case. As a result, the electrostatic force applied to the ink 1 at the front end portion of the recording electrode 4 is intensified to let the ink 1 swollen like a meniscus be easily splashed.

Additionally, the opposite electrode 6 is formed in a laterally elongated construction in general, which construction will cause danger of electric shock.

OBJECT AND SUMMARY OF THE INVENTION

It is a first object of the present invention to provide a printing device which may eliminate undue splash of the ink from the front end portion of the recording electrode.

It is a second object of the present invention to provide a printing device which may eliminate the danger of electric shock.

According to the present invention, there is provided a printing device comprising a switch for conditioning the recording electrode and the opposite electrode at an earth potential under a non-printing or a print waiting condition. A voltage is preliminarily applied between the recording electrode and the opposite electrode so as to retain the ink like a meniscus at the front end portion of the recording electrode and let the ink be easily splashed from the front end portion of the recording electrode. On the other hand, since the recording electrode and the opposite electrode are conditioned at the earth potential by means of the switch under the non-printing or the print waiting condition, an electrostatic force is not applied to the ink retained at the front end portion of the recording electrode, and the ink is not swollen like a meniscus. That is to say, when the ink at the front end portion of the recording electrode is intended to be splashed, it is splashed under the meniscus condition where the ink can be easily splashed. In contrast, when the printing device is under the non-printing or the printing waiting condition, the ink is so retained as to be unnecessarily splashed. Thus, it is possible to maintain an ideal printing condition where a recording paper and the like are not stained during printing.

DESCRIPTION OF THE PREFERRED EMBODIMENTS

Figure 1:
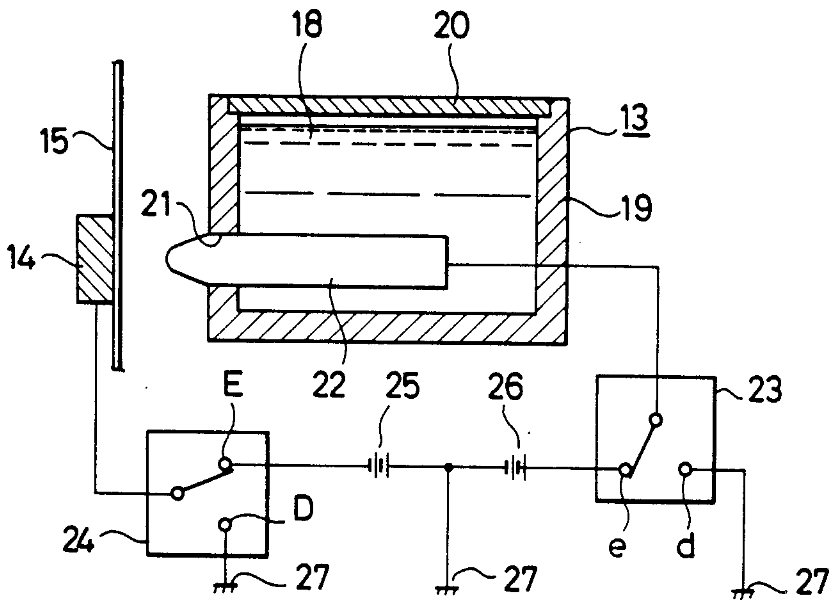
FIG. 1 is a vertical sectional view of a preferred embodiment according to the present invention, primarily showing the recording electrode and the opposite electrode in relation to the connection therebetween.
Figure 2:
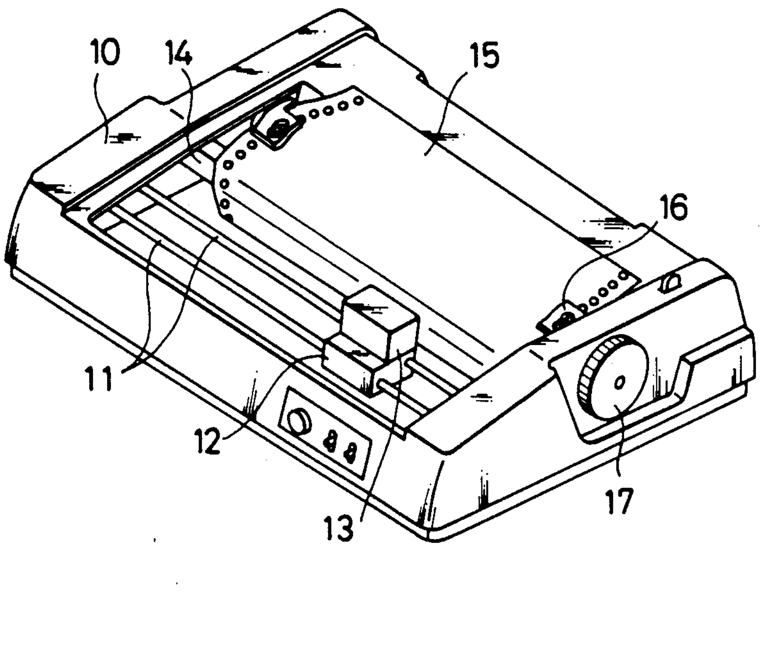
FIG. 2 is a general perspective view of the printing device.

There will be now described preferred embodiments of the present invention with reference to FIGS. 1 to 6. A case 10 of a printer body has a box-like form, and includes two horizontal guide shafts 11. A carrier 12 is transversely reciprocatably mounted to these guide shafts 11, and a printing head 13 is mounted on the carrier 12. A laterally elongated opposite electrode 14 is located at a central portion of the case 10 in such a manner as to extend along the guide shafts 11 in opposed relation with the printing head 13. A pair of tractors 16 are provided on the rear side of the opposite electrode 14 to feed a recording paper 15 as a recording medium to be guided between the opposite electrode 14 and the printing head 13. The tractors 16 are linked to an operating knob 17 projecting sidewardly from an outer side surface of the case 10.

The construction of the printing head 13 will be now described. The printing head 13 comprises an ink tank 19 for storing ink 18 therein and a cover 20 for closing an upper opening of the ink tank 19. The ink tank 19 is formed with a plurality of electrode holes 21 horizontally arranged at a lower portion of a side wall thereof in opposed relation with the opposite electrode 14. A plurality of recording electrodes 22 are immersed in the ink 18 stored in the ink tank 19, and are fixedly engaged at their front ends with the electrode holes 21. The recording electrodes 22 are formed by integrally molding a conductive fibrous material into a bundle with gas permeability in the direction of the fiber maintained. Each of the front ends of the recording electrodes 22 is made round.

The recording electrodes 22 are connected at their rear ends to a recording electrode switch 23 as a switch, while the opposite electrode 14 is connected to an opposite electrode switch 24 as a switch. The recording electrode switch 23 includes two change-over contacts d and e. Similarly, the opposite electrode switch 24 includes two change-over contacts D and E. The contacts d and D are connected to the case 10, that is, they are grounded at 27. On the other hand, the contacts e and E are connected to each other through a primary power source 25 and a secondary power source 26 as a power source. A midpoint between the primary power source 25 and the secondary power source 26 is grounded at 27. Further, the recording electrode switch 23 and the opposite electrode switch 24 are connected to a print control circuit (not shown).

In operation, the ink 18 in the ink tank 19 is impregnated in the recording electrodes 22, and is supplied to the front end portions thereof. When voltage is applied between the recording electrodes 22 and the opposite electrode 14 from the primary power source 25 and the secondary power source 26, the ink 18 at the front end portions of the recording electrodes 22 is affected by an intensive electrostatic force, and is splashed toward the opposite electrode 14. As a result, dots are formed on the recording paper 15 to obtain a printed character by the aggregation of the dots.

Figure 3:
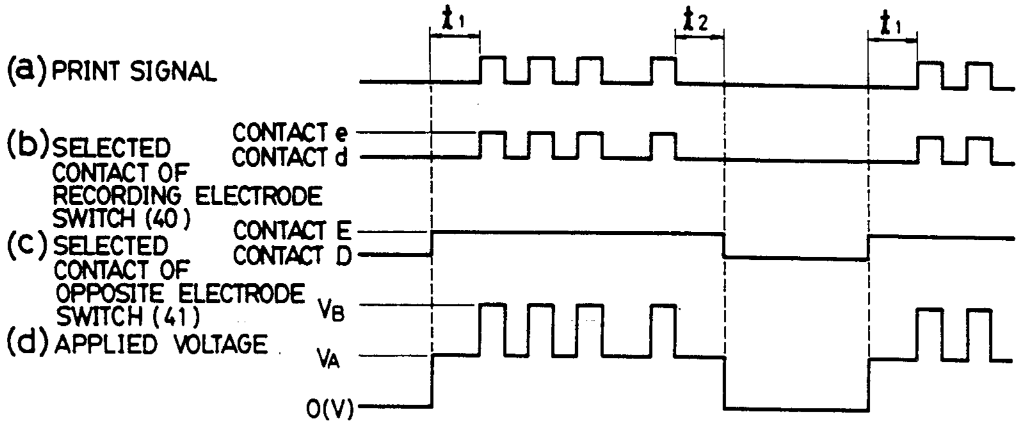
FIG. 3 is a timing chart showing a selected condition of the switch and an applied voltage to the switch according to a print signal.

The connection between the recording electrodes 22 and the opposite electrode 14 will be now described in detail with reference to FIG. 3. The printing head 13 is transversely moved along the guide shafts 11 during printing, and the direction of scanning of the printing head 13 is inverted at the transversal ends of the scanning. For this period of time, an electrical condition of the recording electrodes 22 is classified into a print waiting time, a print ready time, and a printing time. Under each of the electrical conditions of the recording electrodes 22, the selection of the contacts in the recording electrode switch 23 and the opposite electrode switch 24 is carried out by the print control circuit in the following manner.

(1) At the print waiting time, the contacts d and D are selected.

(2) At the print ready time, the contacts d and E are selected.

(3) At the printing time, the contacts e and E are selected.

Accordingly, at the print waiting time, the recording electrodes 22 and the opposite electrode 14 are at an earth potential, and an applied voltage to the recording electrodes 22 is 0 (V). At the print ready time, a voltage $V_A$ of the primary power source 25 is applied through the ground 27 to the recording electrodes 22. As a result, the ink 18 at the front end portions of the recording electrodes 22 is affected by a weak electrostatic force, and is swollen like a meniscus from the front ends of the recording electrodes 22. At the printing time, a voltage $V_B$ of the secondary power source 26 in addition to the voltage $V_A$ is applied to the recording electrodes 22. As a result, the ink 18 at the front end portions of the recording electrodes 22 is affected by an intensive electrostatic force, and is splashed toward the opposite electrode 14.

More concretely, when a print start signal is generated from the print control circuit, the print waiting condition is synchronously switched to the print ready condition at this time, the voltage $V_A$ is applied between the recording electrodes 22 and the opposite electrode 14, and accordingly, the ink 18 at the front end portions of the recording electrodes 22 is swollen like a meniscus. Subsequently, when a print signal is generated from the print control circuit, the ink 18 is splashed toward the opposite electrode 14. At an elapsed time $t_2$ after generation of the print signal, the print ready condition is switched to the print waiting condition. Thus, the ink 18 at the front end portions of the recording electrodes 22 is splashed in the form of a meniscus. Accordingly, the ink 18 may be smoothly separated from the front end portions of the recording electrodes 22, and a splash amount and a splash direction of the ink 18 may be made proper. In contrast, at the print waiting time, the ink 18 at the front end portions of the recording electrodes 22 is retained under no swollen condition like a meniscus. Therefore, even when any shock is applied to the recording electrodes 22 in the scan inversion operation of the printing head 13, the ink 18 is not splashed in the form of the fine particles or drops, and it is possible to prevent the recording paper 15 to prevent the recording paper 15 from being stained by the undue splash of the ink 18. Thus, an ideal print condition may be maintained.

Further, at a non-printing time, the ink 18 at the front end portions of the recording electrodes 22 is similarly retained under no swollen condition like a meniscus. The non-printing time means a period of time when a power switch is turned on, and thereafter such an on-condition is maintained with no schedule of printing. Accordingly, the non-printing time is differentiated from the print waiting time in the printing operation according to the presence of schedule of printing.

In the scan inversion operation, it is possible to effectively prevent undue splash of the ink 18 which will occur because of potential difference between the recording electrodes 22 and the case 10, since the recording electrodes 22 are at an earth potential in the scan inversion operation.

In addition, the opposite electrode 14 is also at an earth potential at the print waiting time and the non-printing time. Therefore, electric shock may be effectively prevented in spite of the transversely elongated construction of the opposite electrode 14.

In a modified embodiment, sensors may be provided near both ends in the scanning direction of the carrier 12, so as to select the print waiting condition and the print ready condition according to a detective result by the sensors.

Figure 4:
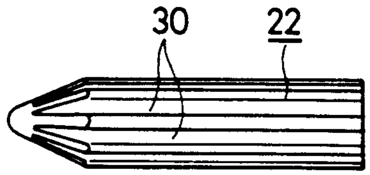
FIG. 4 is a side view of a modified embodiment of the recording electrode.
Figure 5:
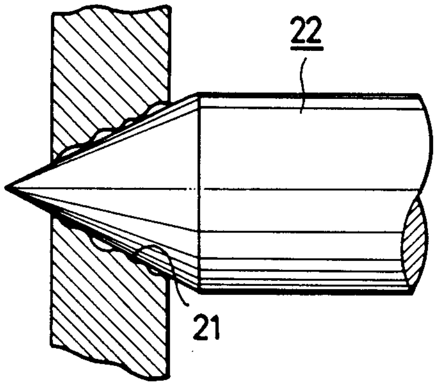
FIG. 5 is a side view of a further embodiment of the recording electrode.
Figure 6:
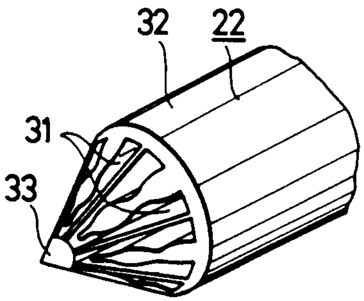
FIG. 6 is a perspective view of a still further embodiment of the recording electrode.
Figure 7:
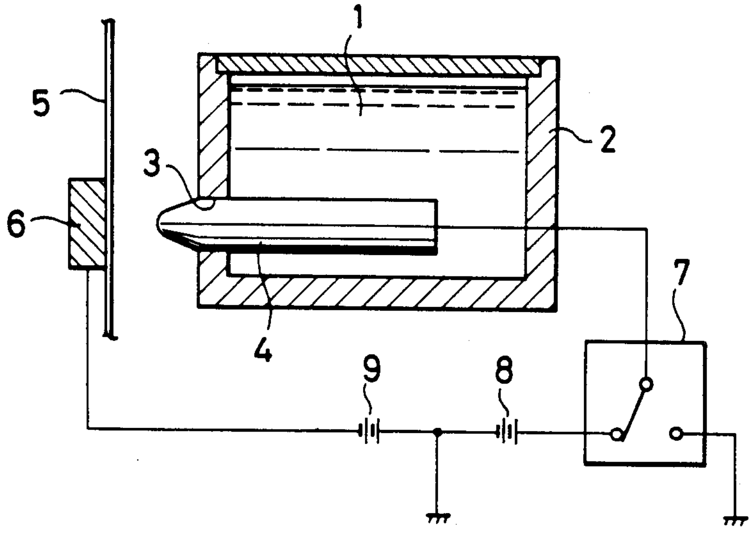
FIG. 7 (PRIOR ART)
FIG. 7 is a sectional side view of the prior art device.
Figure 8:
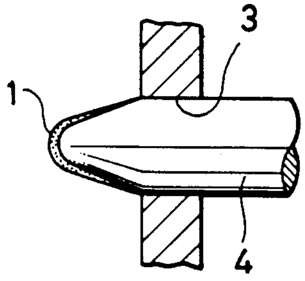
FIG. 8 (PRIOR ART)
FIG. 8 is a side view of the front end portion of the recording electrode shown in FIG. 7.

In a further embodiment, the recording electrodes 22 may be formed of a material having no ink imprenating ability. FIGS. 4 to 6 show some examples of such recording electrodes 22. Referring to FIG. 4, each of the recording electrodes 22 is formed with axial ink guide grooves 30 on the outer circumferential surface thereof. The ink 18 is supplied through the ink guide grooves 30 to the front end portions of the recording electrodes 22. Referring to FIG. 5, the front end portion of each of the recording electrodes 22 is tapered, and each of the electrode holes 21 is also tapered in correspondence with the front end portion. The inner circumferential surface of the electrode holes 21 is a rough surface. The ink 18 is supplied through a gap defined between the recording electrodes 22 and the electrode holes 21 to the front end portions of the recording electrodes 22. Referring to FIG. 6, each of the recording electrodes 22 comprises an insulating rod member 32 having a plurality of ink guide holes 31, and a wire electrode member 33 axially extending in the rod member 32. The ink 18 is supplied through the ink guide holes 31 to the front end portions of the rod member 32. The ink 18 is affected by an electrostatic force in an electric field created between the electrode member 33 and the opposite electrode 14.

Although the printing device employed in the foregoing preferred embodiments is of a serial type, the invention may be, of course, adapted to a line type printing device not including the carrier 12.

What is claimed is:

1. In a printing device including a conductive recording electrode having a front end portion to which ink is supplied, and an opposite electrode arranged in opposed relation to said recording electrode with a recording medium interposed therebetween, wherein said ink supplied to the front end portion of said recording electrode is splashed toward said opposite electrode by an electric field created between said opposite electrode and said recording electrode; the improvement comprising switch means for conditioning said recording electrode and said opposite electrode at an earth potential under a non-printing or a print waiting condition.

2. The printing device as defined in claim 1, wherein said recording electrode and said opposite electrode are connected to a case of said printing device to obtain the earth potential.

3. The printing device as defined in claim 1, further comprising a first and a second power source connected to each other with a midpoint therebetween grounded, said switch means comprising a first switch connected to said recording electrode and having a first contact connected to said first power source and a second contact grounded, and a second switch connected to said opposite electrode and having a third contact connected to said second power source and a fourth contact grounded.

4. In a printing device including a conductive recording electrode having a front end portion to which ink is supplied, and an opposite electrode arranged in opposed relation to said recording electrode with a recording medium interposed therebetween, wherein said ink supplied to the front end portion of said recording electrode is splashed toward said opposite electrode by an electric field created between said opposite electrode and said recording electrode; the improvement comprising a carrier for moving said recording electrode in a transverse direction of said recording medium, and switch means for conditioning said recording electrode and said opposite electrode at an earth potential under a non-printing or a print waiting condition.

5. The printing device as defined in claim 4, wherein a potential of said recording electrode at a scan inversion timing is equal to that of said opposite electrode.

6. The printing device as defined in claim 4, wherein said opposite electrode is in a transversely elongated form extending in a scanning direction of said recording electrode.

7. The printing device as defined in claim 4, further comprising a first and a second power source connected to each other with a midpoint therebetween grounded, said switch means comprising a first switch connected to said recording electrode and having a first contact connected to said first power source and a second contact grounded, and a second switch connected to said opposite electrode and having a third contact connected to said second power source and a fourth contact grounded.

* * * * *